Jan. 20, 1959 SHIH C. CHAO 2,870,348
SYSTEM FOR SELECTIVELY ENERGIZING ONE OF THREE CIRCUITS RESPONSIVE TO VARIATION OF TWO CONDITIONS
Filed Dec. 16, 1957
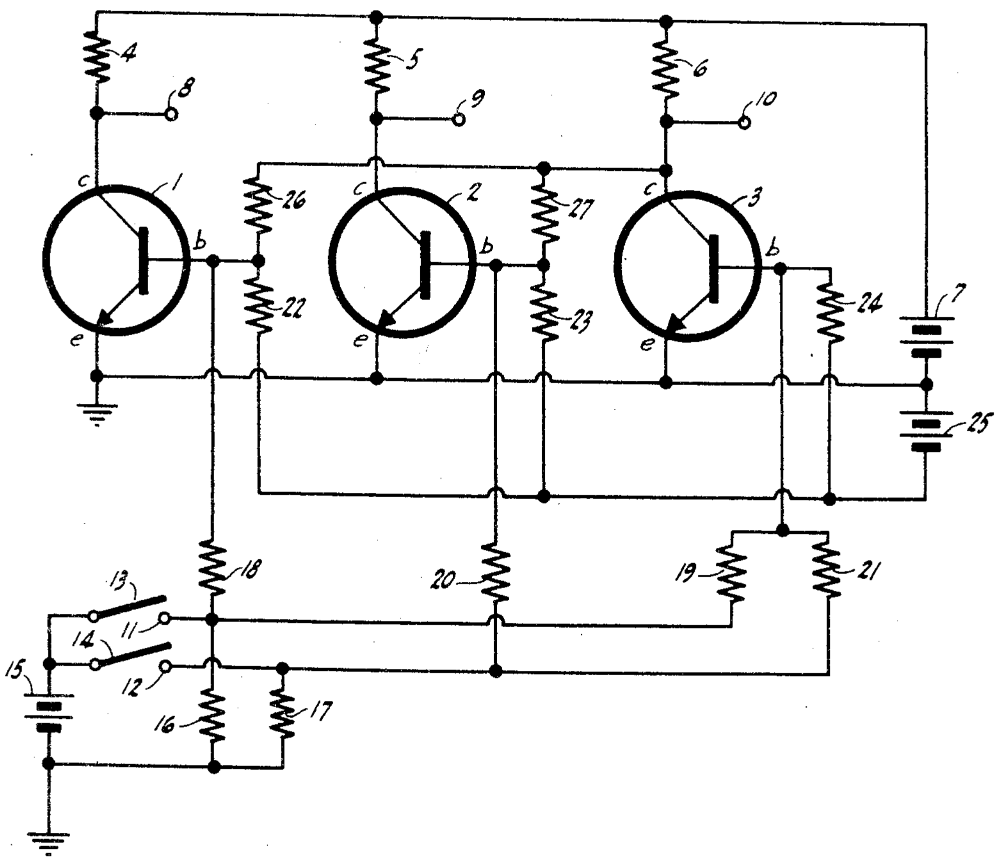
INVENTOR.
SHIH C. CHAO
BY Lippincott, Smith & Pate
ATTORNEYS 2,870,348
Patented Jan. 20, 1959

2,870,348

SYSTEM FOR SELECTIVELY ENERGIZING ONE OF THREE CIRCUITS RESPONSIVE TO VARIATION OF TWO CONDITIONS

Shih C. Chao, Palo Alto, Calif., assignor to International Business Machines Corporation, New York, N. Y., a corporation of New York Application December 16, 1957, Serial No. 702,842

5 Claims. (Cl. 307—88.5)

This invention relates in general to electric logical circuits for use in computing machines and other data-handling systems, and the like, and relates in particular to a novel circuit for providing an electric signal at each of three different output terminals, selectively, responsive to the receipt of an input electric signal and a respective one or both of two different input terminals.

In accordance with this invention, three variable-conductivity electrical devices (preferably transistors) are biased to be non-conductive. First and third ones of these devices are coupled to a first input terminal, and second and third ones are coupled to a second input terminal, so that the receipt of an electric signal at the first input terminal makes the first device conductive, the receipt of an electric signal at the second input terminal makes the second device conductive, and the receipt of electric signals at both of the two input terminals simultaneously makes the third device conductive. Feedback means are provided for rendering the first and second devices nonconductive when the third device becomes conductive, so that only the third device becomes conductive responsive to signals received simultaneously at both input terminals.

The foregoing and other aspects of this invention may be better understood from the following illustrative description and the accompanying drawing. The scope of the invention is pointed out in the appended claims.

In the drawing, the single figure is a schematic circuit diagram showing an exemplary embodiment of the invention.

Referring to the drawing, three transistors are represented by conventional symbols at 1, 2 and 3. By way of example, each of the three transistors may be a junction transistor of the n-p-n type. It will be understood that transistors of the p-n-p type may be substituted, provided that the polarity of all voltage sources is reversed. Each of the three transistors has an emitter terminal, a collector terminal, and a base terminal, which are identified in the drawing by the letters *e*, *c*, and *b*, respectively. It will be noted that each of the three transistors is connected in the so-called grounded-emitter circuit configuration, so that the emitter and collector terminals serve as the principal terminals of the transistor, between which a controlled current flows, while the base terminal serves as a third or control terminal for controlling the conductivity of the transistor between the two principal terminals.

Three resistors 4, 5 and 6 are connected in series with respective ones of the collector terminals of the three transistors, as shown. Thus, three branch circuits are formed, of which each comprises a resistor in series with the two principal terminals of a respective one of the three transistors. These three branch circuits are connected in parallel across a conventional voltage supply 7, which is the source of operating voltage for the three transistors. Three output terminals 8, 9 and 10, are connected to respective ones of the three collector electrodes, so that an output electric signal is provided at each of the output terminals, selectively, whenever the corresponding transistor becomes conductive.

First and second input terminals for receiving input electric signals, are illustrated at 11 and 12. Input signals may be supplied to terminals 11 and 12 by any desired means. For illustrative purposes, the means for supplying input signals may comprise two switches 13 and 14 and a voltage supply 15, connected as shown, so that a positive potential is applied to input terminal 11 whenever switch 13 is closed, and a positive potential is applied to input terminal 12 whenever switch 14 is closed. Resistors 16 and 17, connected as shown, return terminals 11 and 12 to ground potential when switches 13 and 14 are opened.

Resistors 18 and 19 are connected between input terminal 11 and respective ones of the base electrodes of transistors 1 and 3. Resistors 20 and 21 are connected between input terminal 12 and respective ones of base electrodes of transistors 2 and 3. Thus, coupling means are provided for transmitting electric signals from the first input terminal 11 to the third or control terminals of the first and third transistors, and for transmitting electric signals from the second input terminal 12 to the third or control terminals of the second and third transistors.

All three transistors are biased to be nonconductive by biasing means comprising three resistors 22, 23 and 24, and a voltage supply 25 which functions as a source of bias voltage. It will be noted that the source of bias voltage 25 is of opposite polarity to the source of operating voltage 7, and that both sources have one terminal connected to all three of the emitter electrodes. The three resistors 22, 23 and 24 are connected between source 25 and respective ones of the three base terminals, as shown. The bias voltage provided by source 25 is sufficient to make all three transistors nonconductive in the absence of any input signal received at terminals 11 and 12—that is, when switches 13 and 14 are both open.

A feedback circuit comprises two resistors 26 and 27 connected between the collector terminal of transistor 3 and respective ones of the base terminals of transistors 1 and 2. This feedback circuit renders transistors 1 and 2 nonconductive whenever transistor 3 becomes conductive, as is hereinafter more fully explained.

Assume that switches 13 and 14 are both open, so that no input signal is supplied to either of the two input terminals 11 and 12. Under these conditions, little if any current flows through resistors 18 through 21. Current does flow from source 7 through resistors 6, 26 and 22 to source 25, and from source 7 through resistors 6, 27 and 23 to source 25. The resistance of resistor 6 is small compared to that of the resistors in the biasing circuit; and consequently the voltage drop across resistor 6 is small at this time, and the collector terminal of transistor 3 is at a potential only slightly less positive than the supply voltage provided by source 7.

Resistors 26 and 22 are so proportioned that transistor 1 is cut off or nonconductive while switch 13 is open; and, similarly, resistors 23 and 27 are so proportioned that transistor 2 is cut off or nonconductive while switch 14 is open. Therefore, the current that flows through resistor 26 is equal to the current that flows through resistor 22. For purposes of explanation, this will be referred to as one unit of current. Similarly, one unit of current flows through resistors 27 and 23 in series. The base terminal of transistor 3 is at a potential only slightly less negative than the bias voltage provided by source 25, and therefore transistor 3 is also cut off or nonconductive at this time.

Now assume that switch 13 is closed while switch 14 remains open. This raises terminal 11 to a positive potential, which causes current to flow through resistors 18 and 19. These two resistors are proportioned to conduct one unit of current at this time. Now there is one unit of current flowing through resistor 18 toward the base terminal of transistor 1, one unit of current flowing through resistor 26 toward the base terminal of transistor 1, and one unit of current flowing through resistor 22 away from the base terminal of transistor 1. Thus, there is a net flow of one unit of current toward the base terminal of transistor 1. This raises the potential of the base terminal sufficiently to make transistor 1 conductive, whereupon one unit of current flows from the base terminal to the emitter terminal of transistor 1, and a much larger current flows from the collector terminal to the emitter terminal of transistor 1. Consequently, there is now a large voltage drop across resistor 4, and an output signal appears at output terminal 8.

The closing of switch 13 also causes one unit of current to flow through resistor 19 toward the base terminal of transistor 3. However, at this time resistor 24 conducts one unit of current away from the base terminal of transistor 3 to voltage supply 25, and therefore the net current flow to the base terminal of transistor 3 is zero, and transistor 3 remains cut off or nonconductive. Thus, the receipt of an input signal only at input terminal 11 results in the appearance of an output signal only at output terminal 8.

Now assume that switch 13 is opened and switch 14 is closed. One unit of current flows through each of the resistors 20, 21, 22, 23, 24, 26 and 27. In this case, it is evident that transistor 2 becomes conductive, while transistors 1 and 3 remain cut off or nonconductive. Thus, the receipt of an input signal only at input terminal 12 results in the appearance of an output signal only at output terminal 9.

Now assume that switches 13 and 14 are both closed. One unit of current flows through each of the four resistors 18, 19, 20 and 21. Thus, two units of current flow toward the base terminal of transistor 3. Resistor 24 conducts only one unit of current to source 25. Therefore, there is a net flow of one unit of current toward the base terminal of transistor 3, and transistor 3 becomes conductive. The relatively large current flowing between the collector and the emitter terminals of transistor 3 produces a relatively large voltage drop across resistor 6, and the potential at the collector terminal of transistor 3 drops to a small value. Now little, if any, current flows through resistors 26 and 27 of the feedback circuit.

Consequently, although one unit of current flows through each of the resistors 18 and 20 toward the base terminals of transistors 1 and 2, respectively, one unit of current flows away from each of the same base terminals through resistors 22 and 23, and the net current flow to the base terminals of transistors 1 and 2 is substantially zero. Accordingly, transistors 1 and 2 are cut off or nonconducting. Thus, the feedback circuit comprising resistors 26 and 27 renders transistors 1 and 2 nonconductive whenever transistor 3 becomes conductive. It is apparent that the receipt of input signals at both of the input terminals 11 and 12, simultaneously, results in the appearance of an output signal only at output terminal 10.

It should be understood that the following claims are intended to cover all changes and modifications within the true spirit and scope of the invention.

What is claimed is:

1. Logical apparatus comprising first, second, and third variable-conductivity electrical devices each having two principal terminals and a third terminal for controlling the conductivity between said principal terminals, a source of operating voltage for said devices, three resistors each connected in series with a principal terminal of a respective one of said devices, thereby forming three branch circuits each including one of said resistors and the two principal terminals of one of said devices, means connecting said three branch circuits in parallel across said source of operating voltage, first and second input terminals for receiving electric signals, coupling means for transmitting electric signals from said first input terminal to the third terminals of said first and third devices and for transmitting electric signals from said second input terminal to the third terminals of said second and third devices, means biasing said first device to be nonconductive in the absence of a received signal at said first input terminal, means biasing said second device to be nonconductive in the absence of a received signal at said second input terminal, means biasing said third device to be nonconductive in the absence of received signals at both of said input terminals simultaneously, and feedback means rendering both of said first and second devices nonconductive when said third device is conductive, whereby only said first device becomes conductive responsive to a signal received only at said first input terminal, only said second device becomes conductive responsive to a signal received only at said second input terminal, and only said third device becomes conductive responsive to signals received simultaneously at both of said input terminals.

2. Apparatus as defined in claim 1, in which each of said devices is a transistor having emitter, collector, and base terminals, each of said transistors being connected in the grounded-emitter circuit configuration so that its emitter and collector terminals are said principal terminals and its base terminal is said third terminal, said three resistors being connected between said source of operating voltage and respective ones of said collector terminals.

3. Apparatus as defined in claim 2, in which said feedback means comprises two resistors connected between the collector terminal of said third device and respective ones of the base terminals of said first and second devices.

4. Apparatus as defined in claim 3, in which said biasing means comprises a source of bias voltage of opposite polarity to said source of operating voltage, each of said sources having one terminal connected to said three emitter terminals, and three resistors connected between said source of bias voltage and respective ones of said base terminals.

5. Apparatus as defined in claim 4, in which said coupling means comprises a resistor connected between said first input terminal and the base terminal of said first device, another resistor connected between said first input terminal and the base terminal of said third device, another resistor connected between said second input terminal and the base terminal of said second device, and still another resistor connected between said second input terminal and the base terminal of said third device.

No references cited.